United States Patent [19]

Matlock

[11] 4,432,313
[45] Feb. 21, 1984

[54] ALUMINUM BASE MATERIAL WITH HARD FACING DEPOSIT

[75] Inventor: Wallace M. Matlock, Highland Heights, Ohio

[73] Assignee: TRW Inc., Cleveland, Ohio

[21] Appl. No.: 382,726

[22] Filed: May 27, 1982

[51] Int. Cl.$^3$ .............................................. F02F 3/10
[52] U.S. Cl. ............................. 123/193 P; 219/73.11; 219/73.21; 219/76.1; 228/263.17; 277/224; 420/529; 420/531; 420/532; 420/537; 420/538; 428/654
[58] Field of Search ....................... 428/654, 680, 454; 277/224; 219/76.1, 73.11, 73.21; 123/193 P; 228/263 F, 263.17; 75/138, 139, 141, 143, 144, 146, 148; 420/529, 537, 538, 531, 532

[56] References Cited

U.S. PATENT DOCUMENTS

| | | | |
|---|---|---|---|
| 2,188,203 | 1/1940 | Mansfield | 75/138 |
| 2,771,328 | 2/1956 | Wainwright et al. | 309/14 |
| 2,963,780 | 12/1960 | Lyle, Jr. et al. | 75/138 |
| 3,077,659 | 2/1963 | Holzwarth et al. | 428/654 |
| 3,285,717 | 11/1966 | Fischer | 29/197.5 |
| 3,297,435 | 1/1967 | Hanafee | 75/142 |
| 3,306,738 | 2/1967 | Young et al. | 75/143 |
| 3,380,820 | 4/1968 | Hetkey et al. | 75/138 |
| 4,233,490 | 11/1980 | Shalai et al. | 219/121 P |

OTHER PUBLICATIONS

Grant J.; *Hadih's Chemical Dictionary*, pp. 142,144,351,452–453, (1969).
Sims, C. T., et al.; *The Superalloys*, J. Wiley & Sons, New York, pp. 346–350, TN700 35 (1972).

*Primary Examiner*—Michael L. Lewis
*Attorney, Agent, or Firm*—Yount & Tarolli

[57] ABSTRACT

An aluminum base material with a hard facing deposit which shows extremely good hot hardness properties when subjected to high operating temperatures. The invention provides a hard facing deposit which shows a hot hardness of at least 100 BHN at 600° F., and has sufficient toughness to resist the formation of cracks when subjected to such operating temperatures. According to the preferred embodiment, the hard facing deposit includes, by weight, about 6% to about 12% silicon, up to about 6% copper, about 2% to about 6% manganese, up to about 3% iron, and about 16% to about 25% nickel. The invention is particularly useful in forming a heavy duty diesel engine piston with a piston ring groove formed in the hard facing deposit.

27 Claims, 4 Drawing Figures 4,432,313

ALUMINUM BASE MATERIAL WITH HARD FACING DEPOSIT

BACKGROUND OF THE INVENTION

The present invention relates to an aluminum base material with an aluminum alloy deposited on a portion of the aluminum base material to provide a hard facing. The invention relates particularly to a hard facing deposit on aluminum pistons which may be subjected to high operating temperatures, e.g., 600° F.

In most internal combustion engines, the gap between a piston and its respective cylinder wall is sealed by at least one piston ring that is carried by the piston. Specifically, the piston has an annular piston ring groove, and the piston ring is disposed partly in the groove so that it moves with the piston, as the piston reciprocates. The piston ring has surfaces which engage the cylinder wall and surfaces which engage the walls of the piston ring groove in which the ring is located.

Typically, pistons are formed of a base material which is predominantly an aluminum-silicon alloy. Aluminum-silicon alloy is used because it is light weight, and has good wear characteristics, high heat conductivity and low, relatively stable thermal expansion properties at elevated temperatures. As an example, one aluminum alloy which is commercially used as a base alloy for heavy duty diesel engine pistons includes, by weight:

| | |
|---|---|
| Silicon | 10.5%–11.5% |
| Copper | 1.5%–2.0% |
| Manganese | 0.4%–0.9% |
| Iron | 0.7% maximum |
| Zinc | 0.4% maximum |
| Magnesium | 0.5%–0.9% |
| Impurities | 0.8% maximum |
| Aluminum | balance |

Many aluminum-alloys which are used as a base material for a piston do not have a high degree of hot hardness, i.e., the ability to resist deformation at high operating temperatures. In heavy duty diesel engines, the piston ring groove may be subjected to contact with the piston ring at temperatures as high as 600° F. At such elevated temperatures, most metals, and particularly aluminum-silicon alloys, lose a significant amount of their ability to resist deformation. Moreover, the high pressures which exist in the combustion chamber can apply considerable forces to parts of the piston ring groove, either directly or through the piston ring. If the hot hardness of the walls of the piston ring groove is not enough to resist deformation when subjected to high temperatures and pressures, then the piston ring may not properly seal the combustion chamber. Blow-by (i.e., flow of combustion gases past the piston ring) may occur, lessening the engine's compression ratio and adversely affecting the operation of the engine.

Various techniques have been utilized to minimize deformation of the walls of a piston ring groove. One method is to cast or forge an aluminum base alloy around a ring of harder material such as Ni-resist (a term used in the metallurgical arts for a nickel-containing cast iron), and machine a piston ring groove out of the ring. This technique can increase the hot hardness of the piston ring groove, but it also has some undesirable characteristics. One undesirable characteristic is that the casting or forging operation may not produce a good metallurgical bond between the Ni-resist and the base alloy. Without a good metallurgical bond, the heat conductivity between the material that forms the piston ring groove and the base alloy would not be good, thus impeding the overall ability of the piston to conduct heat away from the area around the piston ring groove.

Another technique which has been suggested for increasing the hot hardness of a piston ring groove is disclosed in U.S. Pat. No. 3,285,717. According to the patent, an aluminum hard facing alloy is welded to the piston, and a piston ring groove is formed at least partly in the weld deposit. The aluminum hard facing alloys disclosed in the patent would include, by weight, 12–30% silicon, 10–30% copper, 2–6% manganese and 0–6% iron.

The alloys disclosed in U.S. Pat. No. 3,285,717 are indicated as having a hot hardness ranging from 45 BHN to 139 BHN at 600° F. Applicant believes those values to be the hot hardness values for the alloys in an "undiluted" state, i.e., before they are welded to the base alloy. However, in welding a commercially available form of the alloys of U.S. Pat. No. 3,285,717 to the commercial aluminum base piston alloy disclosed above, the hot hardness of the hard facing alloy, even before welding, was found to be well below the level applicant was trying to achieve (i.e., 100 BHN at 600° F). During the welding process, the hard facing alloy was diluted by the base material, and there was a significant decrease in hot hardness of the weld deposit. Specifically, an aluminum hard facing alloy consisting essentially of 20% silicon, 15% copper, 4% manganese, 2% iron, and balance aluminum was welded to the piston base alloy set forth above. The weld alloy, in an undiluted state, showed a hot hardness of 63.7 BHN at 600° F. After being welded to the piston base alloy, the weld deposit showed a hot hardness of about 50 BHN at 600° F. When piston ring grooves were machined into weld deposits of the hard facing material, significant deformation of the ring groove walls was experienced at high temperatures.

Applicant, and applicant's assignee, believes that for heavy duty diesel piston applications, the hot hardness of a weld deposit should be substantially improved over the hot hardness properties experienced above. Specifically, applicant believes the weld deposit should have a hot hardness of at least about 100 BHN at 600° F., and should preferably have a hot hardness of considerably above 100 BHN at 600° F. (i.e., 150 BHN or more), to resist deformation adequately when subject to the operating temperatures and pressures in a heavy duty diesel engine.

SUMMARY OF THE INVENTION

The present invention relates to an aluminum base material with a hard facing deposit thereon, the hard facing deposit showing extremely good hot hardness properties when subjected to the temperatures encountered by a heavy duty diesel engine piston. Specifically, the invention provides an aluminum base material with a hard facing deposit which, even if diluted by the aluminum base material, will have a hot hardness of at least about 100 BHN at 600° F. Moreover, the invention provides a hard facing deposit which, despite a relatively high nickel content, can be satisfactorily welded to an aluminum-silicon base material without cracking and which has sufficient toughness to resist the formation of cracks when subjected to the operating temperatures and pressures of a diesel engine.

According to a broad aspect of the invention, the hard facing deposit consists essentially of an aluminum alloy which includes, by weight, (i) about 54% to about 65% aluminum, (ii) about 34% to about 17% of materials selected from a group consisting essentially of nickel, manganese, iron, cobalt, and combinations thereof, and (iii) a balance of materials selected from a group consisting essentially of silicon, copper, and combinations thereof. Preferably, the hard facing deposit includes, by weight, about 6% to about 12% silicon, up to about 6% copper, about 2% to about 6% manganese, up to about 3% iron, about 16% to about 25% nickel, and balance aluminum, where the alloying material comprise at least about 34% by weight of the total alloy.

Moreover, the invention provides an aluminum base material with a hard facing deposit which has potential utility beyond the facing of piston ring grooves, where high temperature hardness is important.

BRIEF DESCRIPTION OF THE DRAWINGS

Further features of the present invention will be apparent to those skilled in the art to which it relates from the following detailed description of a preferred embodiment of the present invention made with reference to the accompanying drawings in which.

DESCRIPTION OF PREFERRED EMBODIMENT

Figure 1:
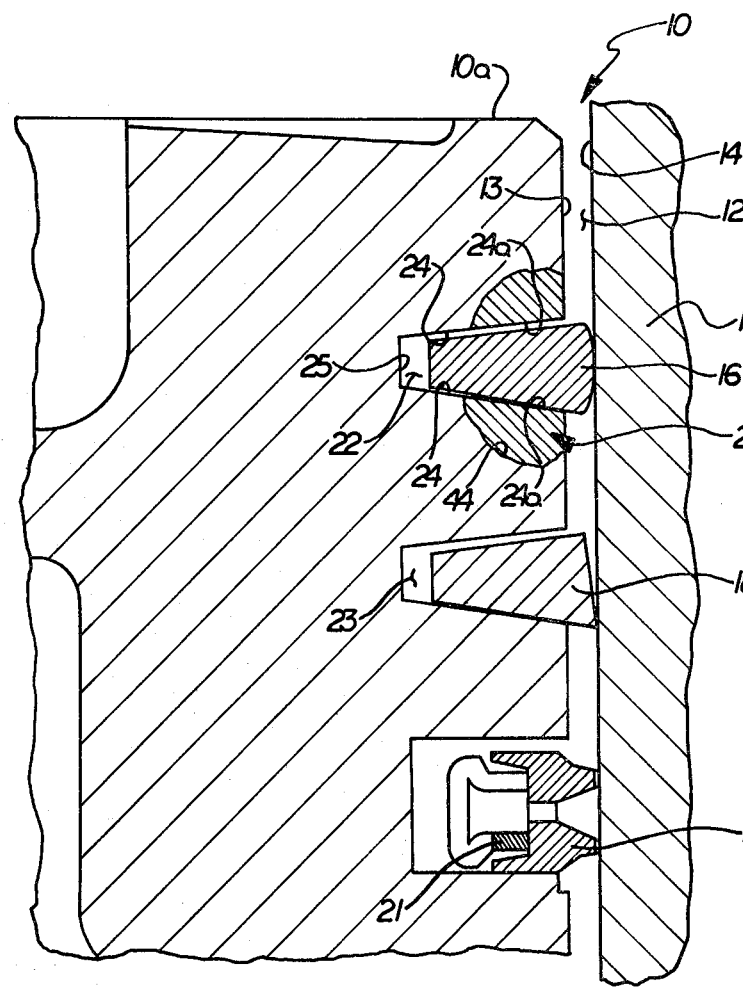
FIG. 1 is a fragmentary cross sectional view of a piston having a piston ring groove formed in a hard facing deposit embodying the present invention.

FIG. 1 illustrates a section of a piston 10 for an internal combustion engine. The piston 10 has an upper surface 10a which is acted on by the hot expanding gases of an ignited fuel charge in the engine's combustion chamber, and a lower surface (not shown) which is exposed to the lower temperatures of the engine's crank case. The piston 10 reciprocates in a cylinder 11 having a cylinder wall 14. There is a gap 12 between the piston's outer surface 13 and the cylinder wall 14. In the disclosed embodiment, the gap 12 is sealed by a series of piston rings 16, 18 and 20 carried by the piston 10. The piston rings 16 and 18 are compression rings which are disposed in respective piston ring grooves 22, 23. The ring 20 is an oil control ring which is biased into engagement with the cylinder wall 14 by means of an expander spring 21.

The upper piston ring groove 22, as shown, is formed partly in a hard facing deposit 26 according to the principles of the invention. Further, it will be clear to those of ordinary skill in the art that any of the other piston ring grooves can also be formed in a hard facing deposit according to the principles of the invention.

The piston ring groove 22 includes an inner wall 25 which extends parallel to the piston's axis, and side walls 24 which diverge from each other as they extend radially outward from the inner wall 25. The compression ring 16 has side walls 27 (see FIG. 2) which preferably diverge from each other at a slightly different angle than the side walls 24. Other configurations of the piston ring groove and/or piston ring are also possible.

Figure 2:
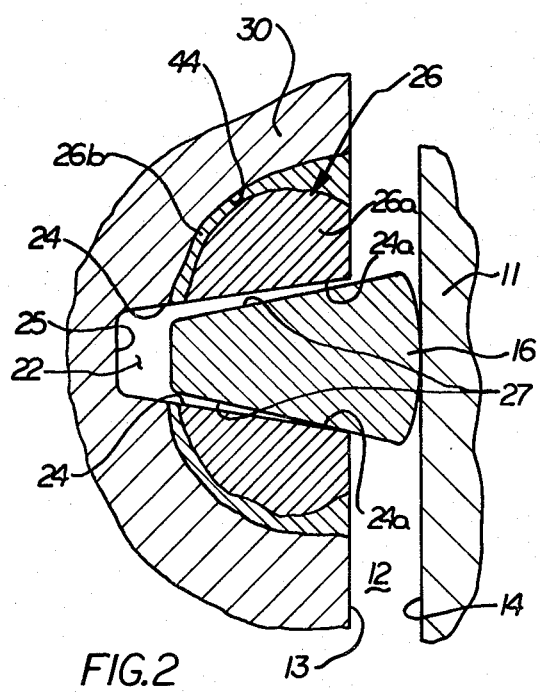
FIG. 2 is an enlarged cross sectional view of the ring groove area of the piston of FIG. 1.

As seen from FIGS. 1 and 2, the compression ring 16 has a relatively loose fit in the piston ring groove 22. Combustion gases can thus flow into the area radially inward of the ring 16 (i.e., adjacent the inner wall 25) and force the ring 16 radially outward against the cylinder wall 14. As the piston 10 reciprocates, the compression ring 16, which is harder than the base material of the piston, is forced alternately against opposite radially outer portions 24a of the side walls 24 of the piston ring groove 22. Thus, the radially outer portions 24a of the side walls 24 need to be hard enough to withstand repeated engagement with the compression ring 16 at the high temperatures and pressures to which the piston is subjected, without appreciable deformation. Accordingly, the radially outer portions 24a of the side walls 24 of the piston ring groove 22 are formed in the hard facing alloy deposit 26 in accordance with the present invention. The portions of the piston ring 16 which engage the outer portions 24a of the side walls 24 and the cylinder wall 14 may also be reinforced, in accordance with the teachings of U.S. Pat. No. 4,299,401, in order to protect them against deterioration.

FIG. 2 schematically illustrates the metallurgical configuration of the piston 10 with the hard facing deposit 26 on it. The main body of the piston 10 comprises an aluminum-silicon base alloy 30 which is light weight and has good wear characteristics, high heat conductivity, and low, relatively stable thermal expansion properties at elevated temperatures. As an example, a commercial base alloy for forming aluminum pistons for heavy duty diesel engines has the following composition (by weight):

| | |
|---|---|
| Silicon | 10.5%–11.5% |
| Copper | 1.5%–2.0% |
| Manganese | 0.4%–0.9% |
| Iron | 0.7% maximum |
| Zinc | 0.4% maximum |
| Magnesium | 0.5%–0.9% |
| Impurities | 0.8% maximum |
| Aluminum | balance |

The hard facing deposit 26 of the invention includes a portion 26a of hard facing alloy which shows little dilution by the base alloy 30, and another portion 26b which is somewhat diluted by the base alloy and metallurgically bonds the undiluted portion 26a to the base alloy 30.

The piston ring groove 22 is formed in the hard facing deposit 26, and extends through the hard facing deposit 26 into the base alloy 30. This construction is desirable because the only parts of the piston ring groove 22 which need to be formed of the hard facing deposit are the radially outer portions 24a which are likely to be contacted by the piston ring 16. Moreover, because the softer base alloy 30 has greater notched fatigue strength than the hard facing alloy deposit 26, the likelihood of fatigue cracks forming at the radially innermost portions of the piston ring groove 22 is minimized.

In applying the hard facing deposit to the piston, a recess 44 (FIG. 3) is initially formed in the base material 30, preferably by machining. The recess 44 is generally a semi-circle in cross section. Its radius is preferably such that the width of hard facing weld deposit 26, both above and below the walls 24 will be at least 45% of the width of the piston ring groove width, in the areas 24a of the groove where substantial contact between the compression ring 16 and the piston ring groove takes place. The base alloy 30 is then preheated to a temperature of about 500° F., and the hard facing alloy 26 is deposited in the recess 44, preferably by a plasma-transferred arc (PTA) technique. The piston is air cooled internally to make sure its temperature does exceed 570° F. after welding. The piston is heat treated at about 940° F. for about two hours and is water quenched. Next, the piston is aged for four hours at about 460° F., then air cooled. Finally, the piston ring groove 22 is machined into the hard facing deposit 26 and the outer surface of the piston is machined to a smooth finish.

Applicant prefers a plasma-transferred arc welding technique (PTA) for welding the hard facing alloy 26 to the base alloy 30. The technique is well known to those in the art, and should not require additional description. Applicant also prefers the hard facing alloy to be in the form of a cast rod for welding.

As an example of the welding technique, in fabricating 5.5 in diameter diesel engine pistons, the following weld parameters were used:

Rotation—0.76 rpm—(13.1–13.5 in/min)
Rod feed rate—6.5–7.0 in/min
weld current—100–105 Amp—D.C.—reverse polarity
Arc volts—33–37 volts
Shield gas (rate)—helium (60–70 cu/ft/hr)
Plasma gas (rate)—Argon (3.0–5.5 cu./ft./hr)
Stand-off dist—starts at about 1/16–⅛", when arc is established pulls up to about 3/16"
Weld rod diameter—¼ in
Electrode diameter—5/16" with spherical end In welding the pistons, two welding passes were sufficient to deposit the hard facing alloy.

Figure 3:
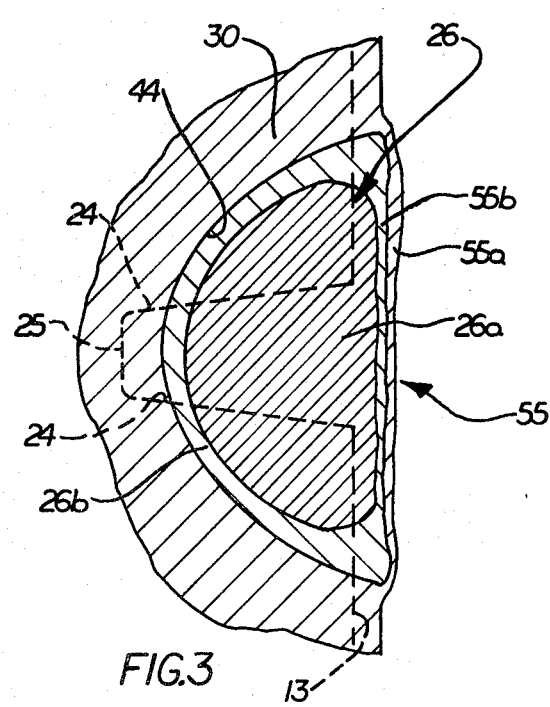
FIG. 3 is a fragmentary schematic cross sectional view of a piston with a hard facing deposit thereon, and out of which hard facing deposit a piston ring groove is to be formed.

During the welding procedure, some dilution of the hard facing alloy by the base material alloy 30 is expected. In many welding operations, 20% dilution throughout a weld deposit is not uncommon. However, applicant has found that with the hard facing deposit of the invention, dilution occurs principally (i) in the portion of the base material 30 adjacent the surface of the recess 44 and (ii) in an outer skin on the weld deposit 26. In the center of the weld deposit, there may be little, if any, dilution of the hard facing alloy. Thus, as shown in FIG. 3, the weld deposit, before formation of the ring groove 22, has (i) a diluted area 26b adjacent the base material 30, (ii) a central core area 26a which is substantially undiluted hard facing alloy, and (iii) an outer skin 55 which includes a layer 55a of base material and a layer 55b of diluted weld alloy. The lines of demarcation between the foregoing areas are not as discrete as they may appear in FIG. 3.

After the welding process has been completed, and the piston and its weld deposit heat treated in the manner discussed above, the piston ring groove 22 is machined into and through the weld deposit. Initially, the outer skin 55 of the weld deposit is removed, so that the outermost portions 24a of the walls 24 of the piston ring groove will be formed in the central area 26 of the weld deposit, which, as discussed above, is substantially undiluted hard facing material. FIG. 3 shows, in dashed lines, the outline of the outer surface of the piston, and the configuration of the piston ring groove 22 which is to be formed in the piston. As seen from the dashed lines, the piston ring groove 22 begins in the area 26a of the weld deposit which is substantially undiluted and extends into the base material 30.

According to the invention, the weld deposit, in the areas 24a in which contact between the compression ring 16 and the ring groove takes place, consists essentially of an aluminum alloy including, by weight, (i) about 54% to about 65% aluminum, (ii) about 34% to about 17% of materials selected from a group consisting essentially of nickel, manganese, iron, cobalt, and combinations of the foregoing, and (iii) a balance of materials taken from a group consisting essentially of silicon, copper, and combinations of the foregoing. Preferably, the weld deposit includes some iron and manganese, at least 16% of materials selected from a group consisting essentially of nickel, cobalt and combinations thereof, and about 6% to about 18% of materials selected from the group consisting essentially of copper, silicon, and combinations thereof. According to the most preferred embodiment, the weld deposit is an aluminum alloy including, by weight, about 6% to about 12% silicon, up to about 6% copper, about 2% to about 6% manganese, up to about 3% iron, about 16% to about 25% nickel, and the balance aluminum, where the content of the alloying material is at least 34% by weight of the alloy.

With a weld deposit having the foregoing composition, the walls 24 of the piston ring groove, in the radially outer areas 24a which are contacted by the piston, should show a hot hardness of at least 100 BHN at 600° F. The portions of the piston ring groove which are formed in the weld deposit which is essentially undiluted alloy, as at 26a, may have a hot hardness of 150 BHN or higher. Further features of the weld deposit are discussed below in connection with the following examples.

Example 1

An aluminum alloy was welded to an aluminum-base piston to produce a piston ring groove with a high hot hardness. The alloy included by weight about 9.9% silicon, 4.87% copper, 19.5% nickel, 3.69% manganese, 1.93% iron and the balance aluminum (60.1%). The alloy, in an undiluted form, had a Brinell hardness of 159.2 BHN at 600° F. The resulting weld deposit on one of the pistons, at points normal to the surface of the weld deposit, and toward the center of the weld bead showed a 600° F. hardness of 99.3 BHN. The nickel content of the weld deposit, toward the center of the weld bead, was measured at about 13.8% nickel. Moreover, while not measured, applicant has strong reason to believe the center of weld deposit had about 2% manganese and about 1% iron. Thus, with a total nickel, manganese and iron content of about 17%, the weld deposit showed a hot hardness of about 100 BHN.

In order to determine an acceptable dilution factor which can maintain the desired hot hardness, the alloy of Example 1 was diluted with the commercial piston base material described above and evaluated for room temperature hardness and 600° F. hardness. The results of the tests are plotted in FIG. 4 (19% nickel), together with similar dilutions of the commercial hard facing alloy discussed above. The hot hardness values of the alloy of Example 1 are shown in the following table:

TABLE I

| Alloy Example 1 | Hardness at Room Temperature | Hardness at 600° F. |
|---|---|---|
| No dilution | 103.5 Rb | 170 BHN |

TABLE I-continued

| Alloy Example 1 | Hardness at Room Temperature | Hardness at 600° F. |
|---|---|---|
| 10% dilution | 106.0 | 153 |
| 20% dilution | 100.0 | 104 |
| 30% dilution | 96.0 | 77.2 |
| 40% dilution | 90.0 | 59.1 |
| 50% dilution | 91.5 | 59.1 |

Further, the chemical compositions of the resulting alloys are shown in the following Table:

TABLE II

| Alloy | Si | Cu | Ni | Mn | Fe | Al | BHN at 600° F. |
|---|---|---|---|---|---|---|---|
| No dilution | (10)* | 5.15 | 19.0 | 4.02 | 1.69 | (60.14)* | 170 |
| 10% dilution | (10.1)* | 4.92 | 17.8 | 3.60 | 1.63 | (61.95)* | 153 |
| 20% dilution | (10.2)* | 4.83 | 16.3 | 3.23 | 1.50 | (63.94)* | 104 |
| 30% dilution | (10.3)* | 4.59 | 14.2 | 2.83 | 1.33 | (66.75)* | 77.2 |
| 40% dilution | 10.38 | 4.66 | 12.4 | 2.48 | 1.22 | 67.29 | 59.1 |
| 50% dilution | (10.5)* | 4.09 | 11.4 | 2.15 | 1.10 | (70.76)* | 59.1 |

*these numbers shown in parenthesis are estimated values.

It can be seen from the foregoing Tables that while the total silicon and copper content of the alloy was relatively constant, the total alloy content of nickel and manganese and iron varied inversely with aluminum content. The hot hardness also decreased as the total nickel, manganese, and iron content decreased. Moreover, with dilutions as high as 20%, and an aluminum content of less than 65%, the alloy showed a hot hardness of at least 100 BHN at 600° F. Thus, with up to 20% dilution during welding, a weld deposit of the alloy of Example 1 should show a hot hardness of at least about 100 BHN at 600° F.

A series of Charpy impact tests was run on the alloy of Example 1. The results indicated the alloy of Example 1 would have a toughness sufficient to withstand cracking under repeated hammering at the high temperature operating conditions of a piston.

Example 2

In the alloy of Example 1, the hot hardness of the alloy decreased with decreasing amounts of nickel, iron and manganese. Also, the nickel content of the weld deposit (16-25%) was higher than what is normally found in most aluminum alloys. Applicant believes the potential brittleness of an aluminum-nickel alloy is a deterrent to providing such a high nickel content. Thus, to evaluate the effect of the nickel content, two heats of high nickel bearing alloys were cast, and showed the following composition:

| | Si | Cu | Ni | Mn | Fe | Al |
|---|---|---|---|---|---|---|
| Alloy 2(a) | 6 | 5 | 25 | 4 | 1 | 59 |
| Alloy 2(b) | 6 | 5 | 30 | 4 | 1 | 54 |

A third heat, similar to the alloy of Example 1, but adding 5% more nickel at the expense of aluminum, had the following approximate composition:

| | Si | Cu | Ni | Mn | Fe | Al |
|---|---|---|---|---|---|---|
| Alloy 2(c) | 10 | 5 | 25 | 4 | 2 | 54 |

Figure 4:
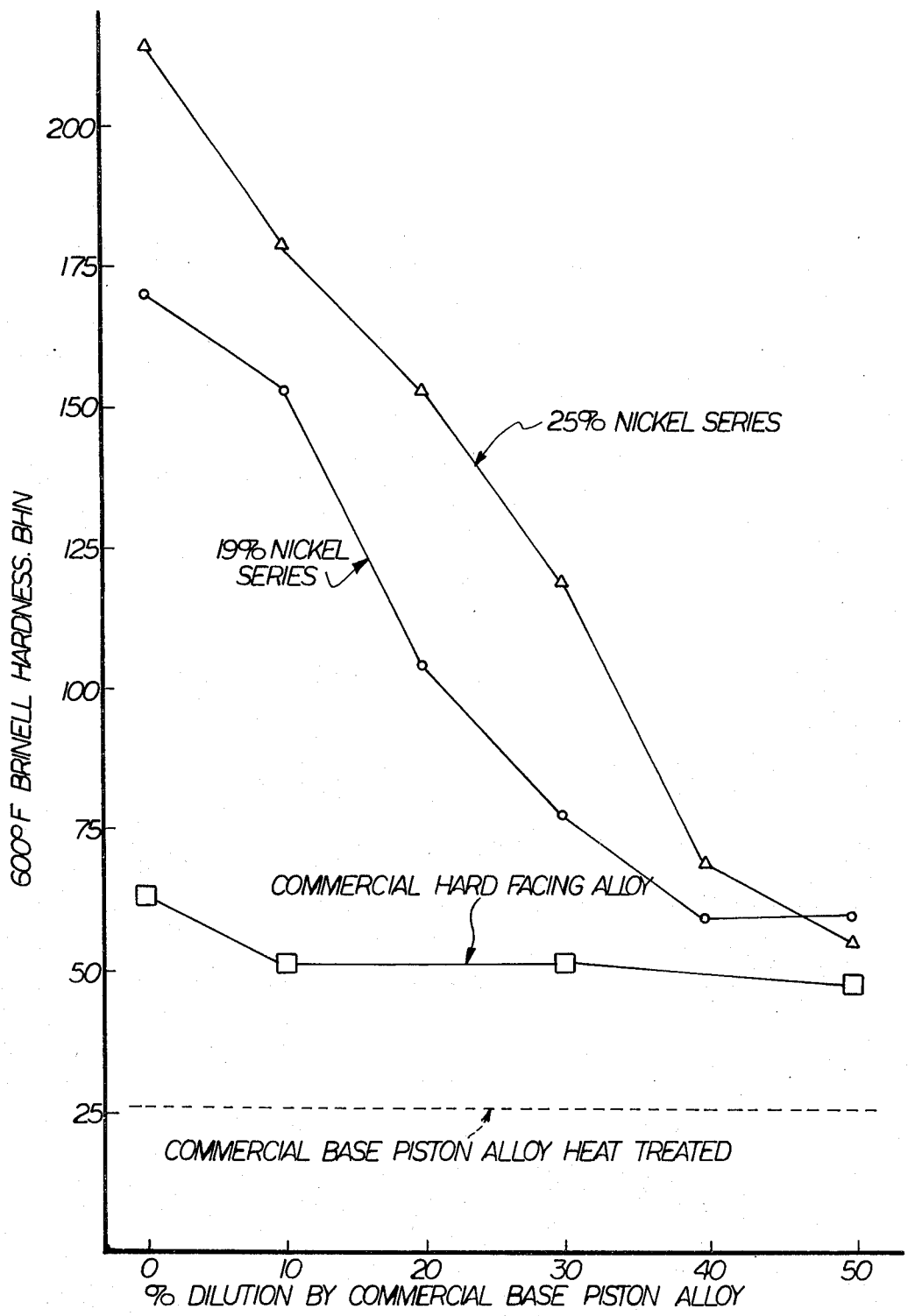
FIG. 4 is a graph plotting high temperature hardness against dilution by a commercial aluminum base alloy, for two examples of weld materials for forming a weld deposit according to the invention.

A dilution series of Alloy 2(a) with the commercial aluminum base material alloy was cast, and the results are plotted in FIG. 4 (25% nickel series) and are shown in the following Table:

TABLE III

| Alloy | Si | Cu | Ni | Mn | Fe | Al | Hardness RT** (Rb) | Hardness 600° F. (BHN) |
|---|---|---|---|---|---|---|---|---|
| No dil | 6.59 | 5.05 | 25.81 | 4.04 | 1.06 | 56.49 | 107 | 214 |
| 10% dil | (6.5)* | 4.90 | 22.6 | 3.60 | 0.97 | (61.4)* | 108 | 179 |
| 20% dil | (7.0)* | 4.67 | 20.9 | 3.32 | 0.86 | (63.25)* | 106 | 153 |
| 30% dil | (7.5)* | 4.58 | 19.1 | 2.89 | 0.72 | (65.2)* | 97.5 | 110 |
| 40% dil | 8.07 | 4.41 | 17.3 | 2.44 | 0.62 | 67.40 | 95.0 | 68.7 |
| 50% dil | (8.5)* | 4.21 | 14.5 | 2.07 | 0.54 | (70.2)* | 94.5 | 55 |

*these numbers shown in parenthesis are estimated values.
**RT is room temperature hardness.

As seen from Table III, with a higher nickel content, and dilutions of up to 30%, the resulting alloy had a hot hardness of above 100 BHN.

In welding two pistons each with the Alloys 2(a), 2(b) and 2(c), it was found that the Alloy 2(a) and 2(c) welds (25% Ni) were satisfactory, but one of the Alloy 2(b) welds showed cracks at the root of the weld bead. Also, one of the weld deposits of Alloy 2(a) developed unsuitable qualities when the piston was water-quenched, and this was believed due to the high nickel content. Accordingly, applicant has concluded that about 25% appears to be the upper practical limit for nickel in the weld deposit.

Finally, applicant has determined that certain elements of the alloys described may be replaced with other elements not heretofore listed, in certain quantities, to achieve comparable results. For example, applicant has determined that a small amount of cobalt may be substituted for some of the nickel and still produce the desired hot hardness. Since cobalt is not as soluble in aluminum as nickel, it appears that 5% cobalt is a practical upper limit for that substitution. Accordingly, any such substitution would probably, as a practical matter, be limited to up to about 5% cobalt if the desired properties are to be maintained.

What is claimed is:

1. An aluminum base material with a hard facing weld deposit thereon, said aluminum base material comprising an aluminum-silicon alloy with at least about 65% aluminum, said hard facing weld deposit consisting essentially of an aluminum alloy including, by weight, (i) about 54% to about 65% aluminum (ii) about 34% to about 17% of materials selected from a group consisting of nickel, manganese, iron, cobalt, and combinations of the foregoing, and (iii) a balance of materials selected from a group consisting of copper, silicon, and combinations of the foregoing, said aluminum alloy comprising at least about 2% of materials selected from a group consisting of iron, manganese, and combinations of the foregoing.

2. An aluminum base material with a hard facing weld deposit thereon as recited in claim 1, wherein said hard facing weld deposit shows a Brinell hardness of at least 100 BHN at 600° F.

3. An aluminum base material with a hard facing weld deposit thereon as recited in claim 1, wherein said aluminum base material comprises part of an internal combustion engine piston, and wherein a piston ring groove is defined at least partially in said hard facing deposit.

4. An aluminum base material with a hard facing weld deposit thereon as recited in claim 3, wherein said aluminum base material consists essentially of the following:

| | |
|---|---|
| Silicon | 10.5%–11.5% |
| Copper | 1.5%–2.0% |
| Manganese | 0.4%–0.9% |
| Iron | 0.7% maximum |
| Zinc | 0.4% maximum |
| Magnesium | 0.5%–0.9% |
| Impurities | 0.8% maximum |
| Aluminum | balance |

5. An aluminum base material with a hard facing weld deposit thereon as recited in claim 3, wherein said aluminum alloy comprises at least about 16% nickel.

6. An aluminum base material with a hard facing weld deposit thereon as recited in claim 5, wherein said aluminum alloy comprises between about 16% and about 25% nickel.

7. An aluminum base material with a hard facing weld deposit thereon as recited in claim 3, wherein said aluminum alloy comprises from about 6% to about 18% of material selected from the group consisting of copper, silicon, and combinations of the foregoing.

8. An alimunum base material having a hard facing weld deposit thereon, said aluminum base material comprising an aluminum-silicon alloy with at least about 65% aluminum, said hard facing weld deposit consisting essentially of an aluminum alloy including, by weight, about 6% to about 12% silicon, up to about 6% copper, about 2% to about 6% manganese, up to about 3% iron, about 16% to about 25% nickel, and balance aluminum, where the alloying materials comprise at least about 34%, by weight, of the total aluminum alloy of the weld deposit.

9. An aluminum base material having a hard facing weld deposit thereon as recited in claim 8, wherein said hard facing weld deposit shows a Brinell hardness of at least about 100 BHN at 600° F.

10. An aluminum base material having a hard facing weld deposit thereon as recited in claim 8, wherein said aluminum base material comprises part of an internal combustion engine piston, and wherein a piston ring groove is defined at least partially in said hard facing weld deposit.

11. An aluminum base material having a hard facing weld deposit thereon as recited in any of claims 8, 9 or 10 wherein said aluminum base material consists essentially of the following:

| | |
|---|---|
| Silicon | 10.5%–11.5% |
| Copper | 1.5%–2.0% |
| Manganese | 0.4%–0.9% |
| Iron | 0.7% maximum |
| Zinc | 0.4% maximum |
| Magnesium | 0.5%–0.9% |
| Impurities | 0.8% maximum |
| Aluminum | balance |

12. An aluminum base material having a hard facing weld deposit thereon, said aluminum base material comprising an aluminum-silicon alloy with at least about 65% aluminum, said hard weld facing deposit consisting essentially of an aluminum alloy comprising at least 34% total alloy materials including at least about 16% of materials selected from a group consisting of nickel, cobalt, and combinations of the foregoing and at least about 2% of materials selected from a group consisting of iron, manganese, and combinations of the foregoing, a hard faced surface being formed at least partially in said hard facing weld deposit, said hard facing weld deposit exhibiting a Brinell hardness of at least about 100 BHN at 600° F.

13. An aluminum base material having a hard facing weld deposit thereon as recited in claim 12, wherein said aluminum alloy comprises at least about 16% nickel.

14. An aluminum base material having a hard facing weld deposit thereon as recited in claim 13, wherein said aluminum alloy comprises from about 16% to about 25% nickel.

15. An aluminum base material having a hard facing weld deposit thereon as recited in claim 12, wherein said aluminum alloy includes by weight about 16% to about 34% of materials selected from a group consisting of nickel, manganese, iron, cobalt and combinations of the foregoing.

16. An aluminum base material having a hard facing weld deposit thereon as defined in any of claims 12–15 wherein said aluminum base material comprises part of an internal combustion engine piston, and wherein said hard faced surface comprises a part of a piston ring groove formed in said piston.

17. An aluminum base material having a hard facing weld deposit thereon as recited in claim 16, wherein said aluminum alloy further comprises between about 6% and about 18% of material selected from the group consisting of copper, silicon, and combinations of the foregoing.

18. An aluminum base material having a hard facing weld deposit thereon as recited in claim 17 wherein said aluminum base material consists essentially of the following:

| | |
|---|---|
| Silicon | 10.5%–11.5% |
| Copper | 1.5%–2.0% |
| Manganese | 0.4%–0.9% |
| Iron | 0.7% maximum |
| Zinc | 0.4% maximum |
| Magnesium | 0.5%–0.9% |
| Impurities | 0.8% maximum |
| Aluminum | balance |

19. An aluminum base material with a hard facing deposit thereon, said aluminum base material comprising an aluminum-silicon alloy with at least about 65% aluminum, said hard facing consisting essentially of an aluminum alloy including, by weight, (i) about 54% to about 65% aluminum, (ii) about 34% to about 17% of materials selected from a group consisting of nickel, manganese, iron, cobalt, and combinations of the foregoing, and (iii) a balance of materials selected from a group consisting of copper, silicon, and combinations of the foregoing, said aluminum alloy comprising between about 16% to about 25% nickel and between about 2% and about 6% manganese.

20. An aluminum base material with a hard facing deposit thereon as recited in claim 19, wherein said aluminum base material comprises part of an internal combustion engine piston, and wherein a piston ring groove is defined at least partially in said hard facing deposit.

21. An aluminum base material with a hard facing deposit thereon as recited in claim 20, wherein said hard facing deposit comprises a weld deposit.

22. An aluminum base material with a hard facing deposit thereon as recited in claim 19, wherein said aluminum alloy comprises up to about 3% iron.

23. An aluminum base material with a hard facing deposit thereon as recited in claim 22, wherein said aluminum alloy further comprises between about 6% and about 18% of material selected from the group consisting of copper, silicon, and combinations of the foregoing.

24. An aluminum base material with a hard facing deposit thereon, said hard facing consisting essentially of an aluminum alloy including, by weight (i) about 54% to about 65% aluminum, (ii) about 34% to about 17% of materials selected from a group consisting of nickel, manganese, iron, cobalt, and combinations of the foregoing, and (iii) a balance of materials selected from a group consisting of copper, silicon, and combinations of the foregoing, said aluminum alloy comprising from about 16% to about 25% nickel, from about 2% to about 6% manganese, and from about 6% to about 18% of material from the group consisting of copper, silicon and combinations of the foregoing.

25. An aluminum base material with a hard facing deposit thereon as recited in claim 24, wherein said aluminum base material comprises part of an internal combustion engine piston, and wherein a piston ring groove is defined at least partially in said hard facing deposit.

26. An aluminum base material with a hard facing deposit thereon as recited in claim 25, wherein said hard facing deposit comprises a weld deposit.

27. An aluminum base material with a hard facing deposit thereon as recited in claim 24, wherein said aluminum alloy comprises up to about 3% iron.

* * * * *